Jan. 1, 1963  T. H. BONN ET AL  3,071,694
SIGNAL TRANSLATING DEVICE
Filed Jan. 8, 1954  14 Sheets-Sheet 1
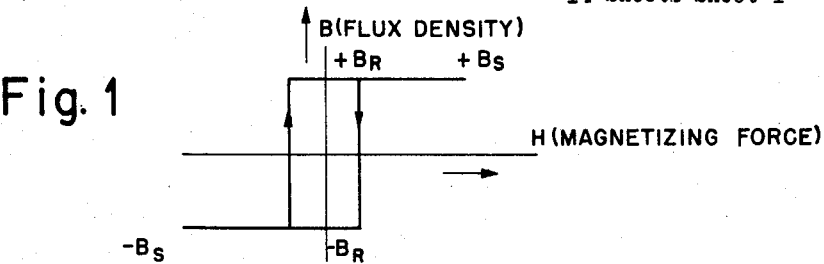
Fig. 1
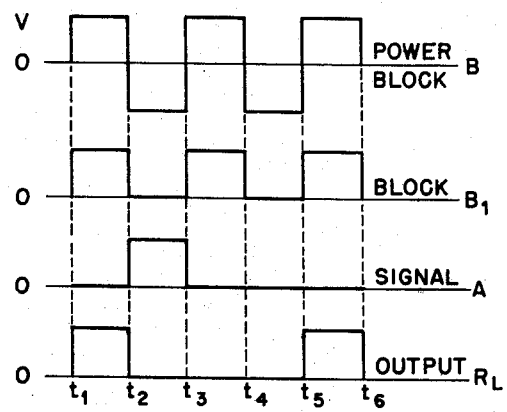
Fig. 2
Fig. 2a
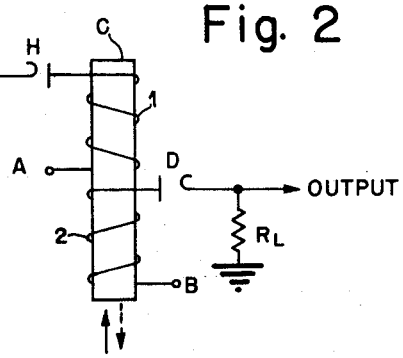
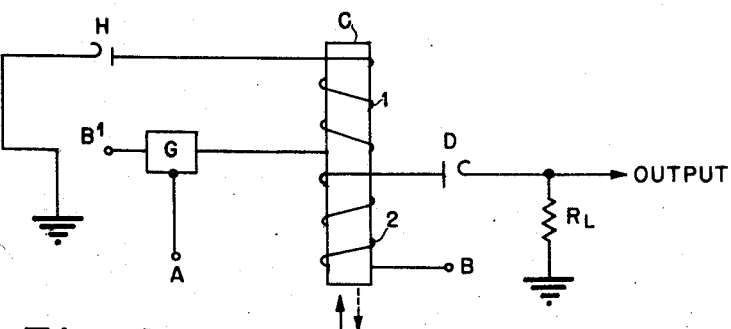
Fig. 3
INVENTORS
THEODORE H. BONN
ROBERT D. TORREY
ATTORNEY Jan. 1, 1963 T. H. BONN ET AL 3,071,694
SIGNAL TRANSLATING DEVICE
Filed Jan. 8, 1954 14 Sheets-Sheet 3

INVENTORS
THEODORE H. BONN
ROBERT D. TORREY

ATTORNEY

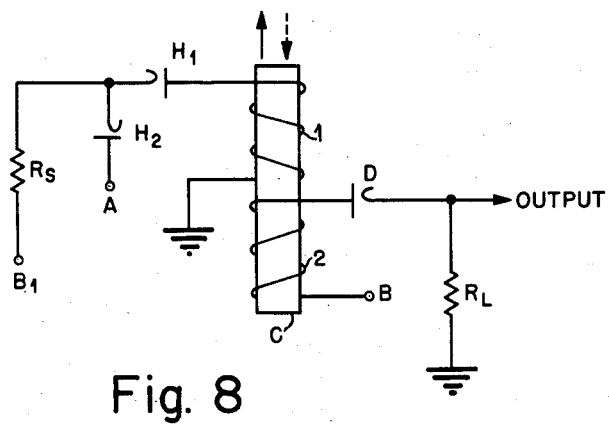
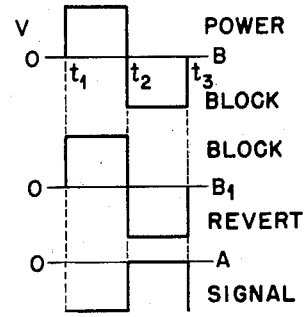
Fig. 8        Fig. 8a
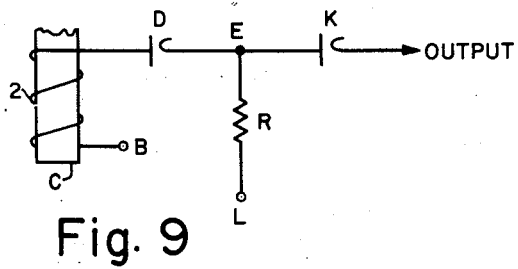
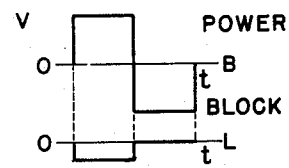
Fig. 9        Fig. 9a
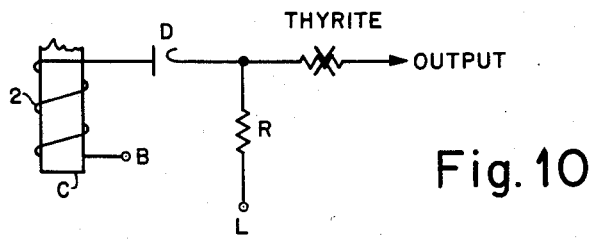
Fig. 10
*INVENTORS*
THEODORE H. BONN
ROBERT D. TORREY
*ATTORNEY*

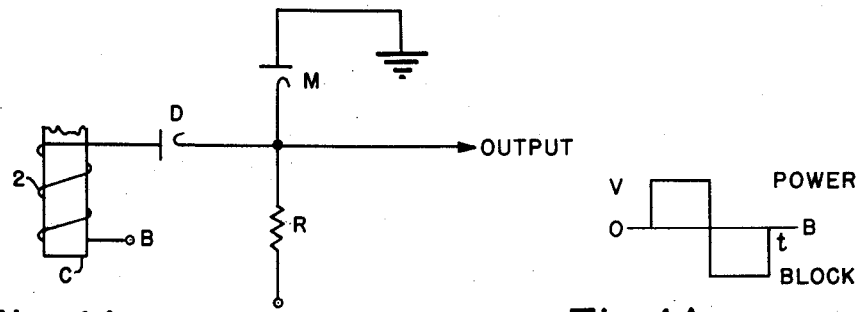
Fig. 11
Fig. 11a
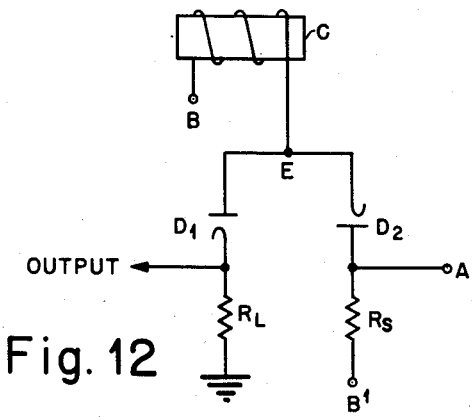
Fig. 12
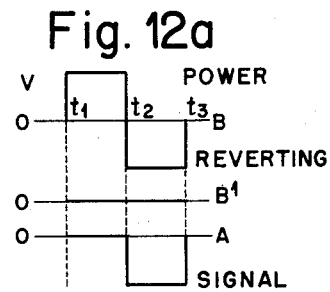
Fig. 12a
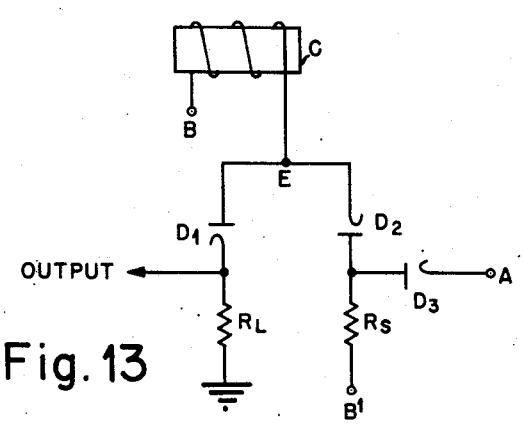
Fig. 13
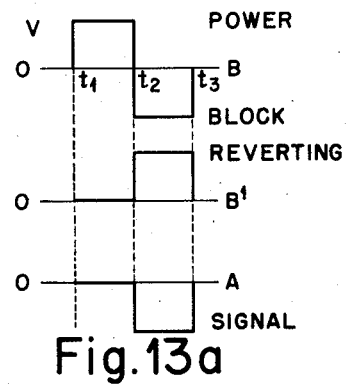
Fig. 13a
INVENTORS
THEODORE H. BONN
ROBERT D. TORREY
ATTORNEY

INVENTORS
THEODORE H. BONN
ROBERT D. TORREY

ATTORNEY

WAVEFORMS IN FIG. 16 a

INVENTORS
THEODORE H. BONN
ROBERT D. TORREY

ATTORNEY

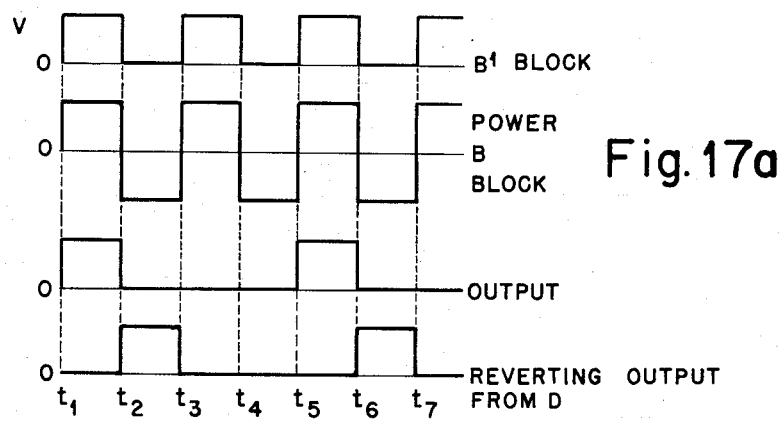
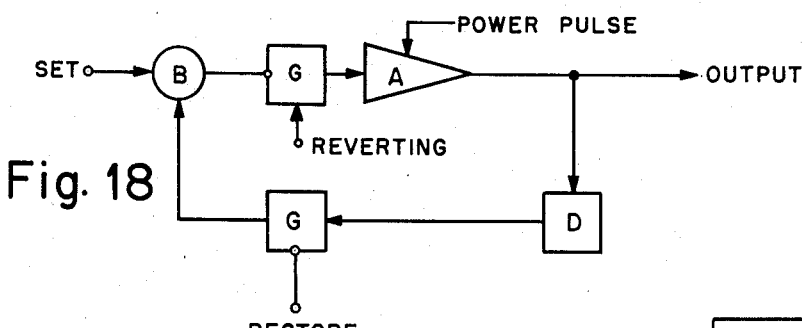
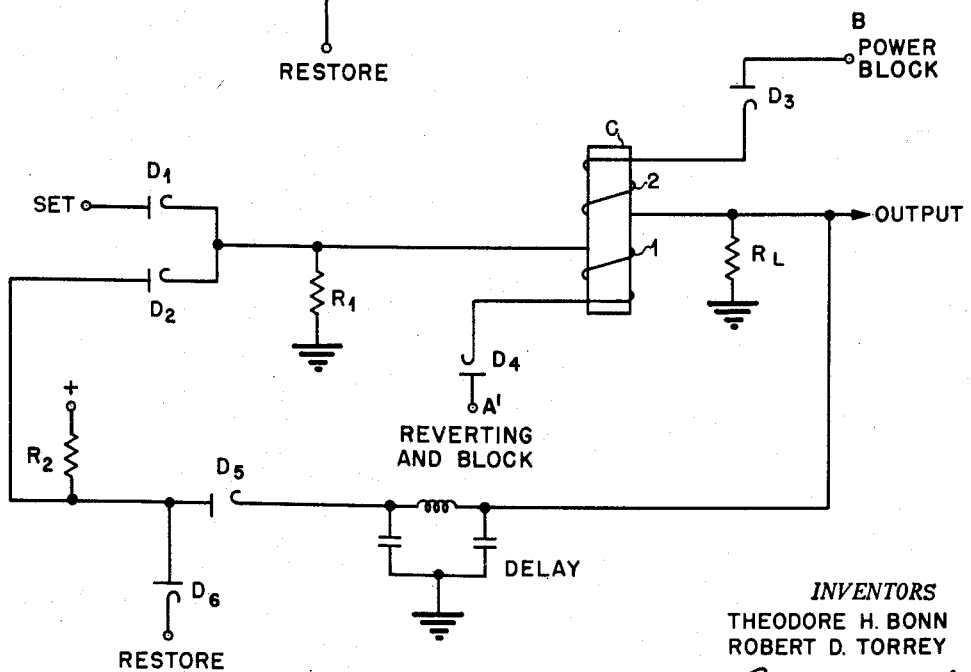

Jan. 1, 1963 T. H. BONN ET AL 3,071,694
SIGNAL TRANSLATING DEVICE
Filed Jan. 8, 1954 14 Sheets-Sheet 9

INVENTORS
THEODORE H. BONN
ROBERT D. TORREY
ATTORNEY

Jan. 1, 1963 T. H. BONN ET AL 3,071,694
SIGNAL TRANSLATING DEVICE
Filed Jan. 8, 1954 14 Sheets-Sheet 11

INVENTORS
THEODORE H. BONN
ROBERT D. TORREY
*ATTORNEY*

INVENTORS
THEODORE H. BONN
ROBERT D. TORREY

INVENTORS
THEODORE H. BONN
ROBERT D. TORREY

ATTORNEY

United States Patent Office 3,071,694
Patented Jan. 1, 1963

3,071,694
SIGNAL TRANSLATING DEVICE
Theodore H. Bonn and Robert D. Torrey, Philadelphia, Pa., assignors, by mesne assignments, to Sperry Rand Corporation, New York, N.Y., a corporation of Delaware
Filed Jan. 8, 1954, Ser. No. 402,858
36 Claims. (Cl. 307—88)

This invention relates to signal controlled translating devices and more particularly to signal controlled translating devices utilizing magnetic phenomena for producing the desired translation and to logical circuits for the use thereof.

In the operation of electronic computing equipment and the like, operating at extremely high speeds, amplifiers are used to perform various logical functions. Electron tubes employing the valving action of a charged grid on an electron stream have been satisfactorily used for amplification purposes. However, a disadvantage in the use of electron tubes is the rather limited like thereof due to failure of such tubes and the fragile construction thereof. It has been proposed to replace the electron tube ampifier elements with solid-state elements that will not be subject to the limited life defects of electron tubes.

Ferromagnetic materials may be employed in such amplifying apparatus. They exhibit a hysteresis loop and display a high impedance when operating over the portion of the loop from minus residual flux density to plus residual flux density and show a low impedance when traveling from plus residual flux density towards plus saturation flux density. Use can be made of these effects for signal translating and amplifying purposes. A way of using this effect is to produce the desired output when and while the core occupies the low impedance portion of its hysteresis loop. The present invention covers devices using this effect and may be conveniently referred to as "series" signal translating or amplifying devices.

With working frequencies in the megacycle region, many problems are encountered. They may deal, for example, with the speed with which a material can traverse its hysteresis loop, with the transmission of unwanted energy to the input circuits and with the generation of spurious outputs.

It is, therefore, a primary object of the invention to provide new and novel signal translating apparatus.

Another object of the invention is to provide new and novel signal translating apparatus operating in series.

An additional object of the invention is to provide new and novel signal translating apparatus which will operate successfully at high frequencies.

A further object of the invention is to provide new and novel signal translating apparatus employing magnetic phenomena.

Another object of the invention is to provide new and novel signal translating apparatus having an efficient and fast operating signal input arrangement.

An added object of the invention is to provide new and novel signal translating apparatus having an improved output arrangement to suppress unwanted outputs.

Still another object of the invention is to provide a new and novel signal translating apparatus utilizing only one coil on a core of ferromagnetic material.

An additional object of the invention is to provide new and novel signal translating apparatus having a steady output when pulses are applied to the input.

An added object of the invention is to provide new and novel complementing apparatus employing magnetic phenomena.

Another object of the invention is to provide new and novel signal translating apparatus which will operate to interlace signals.

A further object of the invention is to provide new and novel signal translating apparatus which will operate as a multi-channel distributor.

Still another object of the invention is to provide new and novel signal translating apparatus functioning as a frequency divider.

An added object of the invention is to provide new and novel signal translating apparatus to operate like a flip-flop.

A further object of the invention is to provide new and novel signal translating apparatus which will function as a pulse counter.

An additional object of the invention is to provide new and novel complementing apparatus operating as a shifting register for use as a delay line or for stepwise-increasing the power gain.

Other objects of the invention will in part be described and in part be obvious as the following specification is read in conjunction with the drawings in which:

FIGURE 1 is a diagram of an idealized hysteresis loop;
FIGURE 2 is a schematic showing of an embodiment of the invention;
FIGURE 2a represents the operating time cycle of the embodiment of FIGURE 2;
FIGURE 3 is a schematic showing of a modification of the invention;
FIGURE 3a represents the operating time cycle of the embodiment of FIGURE 3;
FIGURE 4 illustrates some representative output waveforms of the embodiment of FIGURE 3;
FIGURE 5 illustrates some representative power pulse waveforms for the embodiment of FIGURE 3;
FIGURE 6 is a schematic diagram of a modified input circuit;
FIGURE 6a illustrates the operating time cycle of the embodiment of FIGURE 6;
FIGURE 7 is a schematic showing of a further input circuit;
FIGURE 7a represents the operating time cycle of the embodiment of FIGURE 7;
FIGURE 8 is a schematic showing of another input circuit;
FIGURE 8a represents the operating time cycle of the embodiment of FIGURE 8;
FIGURE 9 is a schematic showing of a modified output circuit;
FIGURE 9a represents the operating time cycle of the embodiment of FIGURE 9;
FIGURE 10 is a schematic showing of a further output circuit;
FIGURE 11 is a schematic showing of another output circuit;
FIGURE 11a represents the operating time cycle of the embodiment of FIGURE 11;
FIGURE 12 is a schematic showing of another embodiment of the invention;
FIGURE 12a represents the operating time cycle a the embodiment of FIGURE 12;
FIGURE 13 is a schematic showing of a modification of the embodiment of the invention of FIGURE 12;

FIGURE 13a represents the operating time cycle of the embodiment of FIGURE 13;

FIGURE 17a represents the operating time cycle for the circuit of FIGURE 17;

FIGURE 18 is a block diagram of an arrangement utilizing the invention for flip-flop effects;

FIGURE 18a is a schematic diagram of the arrangement of FIGURE 18;

Figure 24:
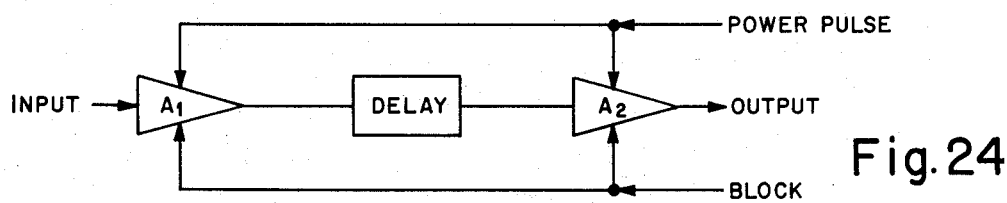
Figure 24A:
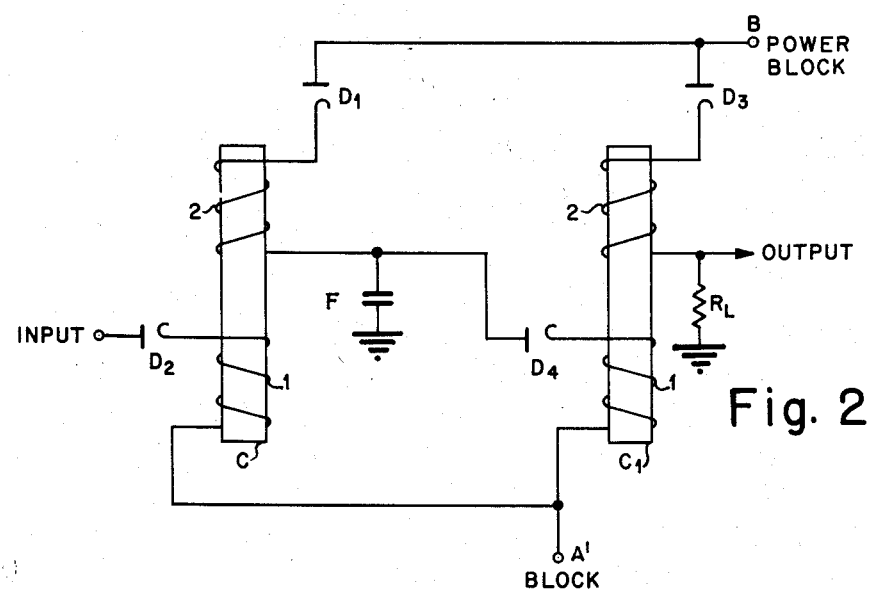

FIGURE 24 gives a block diagram of two signal translating devices connected in cascade with a common power pulse input and a common blocking pulse input, and with a capacitive delay interposed between them;

FIGURE 24a is a schematic showing of one embodiment of the invention based upon the principle illustrated in FIGURE 24.

Figure 24B:
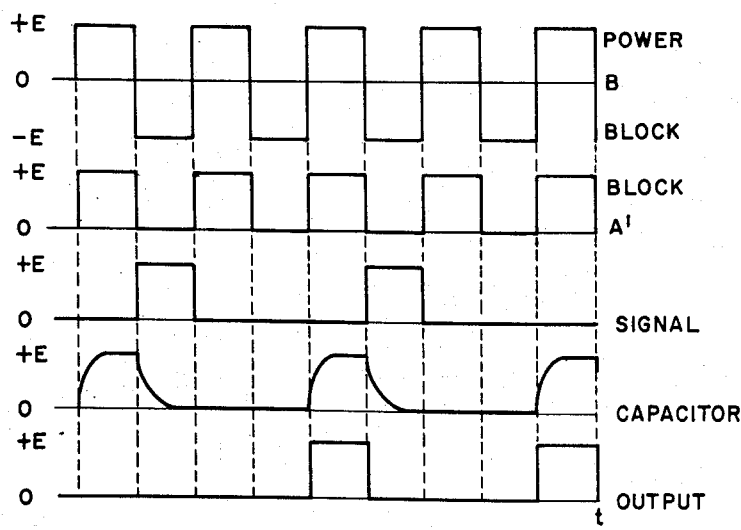

FIGURE 24b represents the operating time cycle for the circuit of FIGURE 24a.

Figure 24C:
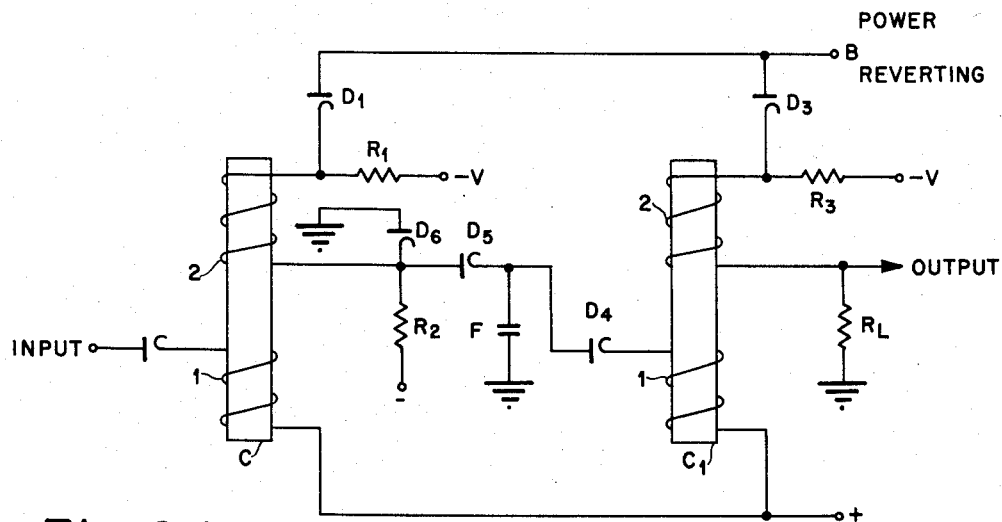

FIGURE 24c is a schematic showing of another embodiment of the invention based upon the principle illustrated in FIGURE 24.

Figure 24D:
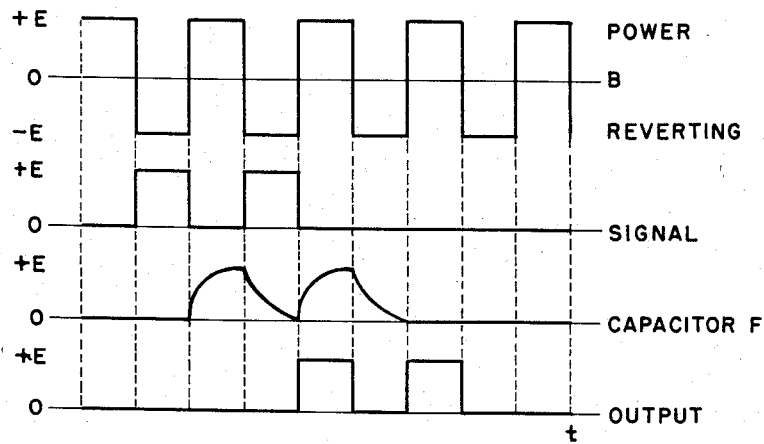

FIGURE 24d represents the operating time cycle for the circuit of FIGURE 24c.

FIGURE 1 illustrates an idealized hysteresis loop of a material which may be used as the core member for the solid-state signal translating devices to be described. $B_R$ signifies residual flux density, and $B_S$ designates saturation flux density. The core material may be made of a variety of materials amongst which are the various types of ferrites and the various kinds of magnetic tapes, including Orthonik and 4—79 Moly-Permalloy. These materials may have different heat treatments to give them different properties. In addition to the wide variety of materials applicable, the cores of the signal translating devices may be constructed in a number of different geometries involving both closed and open paths. For example, cup-shaped cores, strips of material or toroidal cores are possible.

It is to be understood that the invention is not limited to any specific geometries of the cores nor to any specific geometries of the cores nor to any specific materials therefor, and that the examples given are illustrative only. The only requisite is that the material possesses a hysteresis loop preferably approaching the idealized hysteresis loop as shown in FIGURE 1.

As to the different kind of electric pulses to be applied, the following terminology has been used: There are clock pulses and signal pulses. The signal pulses carry information and are, therefore, selectively applied. It depends upon the information to be transmitted whether such pulses are present or not. The clock pulses, in contrast thereto, are automatically applied at fixed intervals and do not carry any information. They may be subdivided into power pulses and blocking pulses. The power pulses usually supply the power for the operation of the translating device or, at least, open a gate to permit another source to operate the device. The blocking pulses block the interference of the power pulse with the signal input circuit and/or of the signal input circuit with the power circuit.

FIGURE 2 is a simplified schematic diagram of the elements of a magnetic signal translating device. Part C is a core of ferromagnetic material. Winding 1 is the input or signal winding, while winding 2 is the output or power winding. Reference is made to the idealized hysteresis loop of FIGURE 1 to assist in describing the operation of this signal translating device. Waveform B, FIGURE 2a, is applied to the power winding through terminal B, its positive half, as, for example, during the period $t_1$ to $t_2$, representing the power pulse, and its negative half, as, for example, during the period $t_2$ to $t_3$, representing a blocking pulse which prevents any current in winding 2 from flowing through diode D during the signal periods, which are the periods $t_2$ to $t_3$ or $t_4$ to $t_5$. The signal is selectively applied during the signal periods at terminal A. During the power pulse periods, which are the periods $t_1$ to $t_2$ or $t_3$ to $t_4$ or $t_5$ to $t_6$, a blocking pulse is applied to the signal winding at terminal B¹, thus blocking diode H and preventing any current flow through the signal winding. As a result, diode D is conducting only during the power pulse periods, and diode H is conducting only during the signal periods.

During the power pulse periods, the positive half of waveform B, the power pulse, establishes flux in the core in the direction of the solid arrow shown at the bottom end of the core, and the core, assumed to be at plus $B_R$ at time $t_1$, travels from plus $B_R$ to plus $B_S$ which represents the low impedance region. An output signal is the result of this operation, and the core returns to plus $B_R$. If a signal is applied during one of the signal periods, flux is established in the core in the direction of the dotted arrow shown at the bottom end of the core, and the core travels from plus $B_R$ to minus $B_R$, which represents the high impedance region, in the counter-clockwise direction. The next following power pulse will set the core back to plus $B_R$, but does not produce an output pulse. It can easily be seen that this device always yields an output pulse in response to the power pulse, except when an input has occurred on terminal A during the preceding signal period. The device, therefore, operates as a complementer because the intended output signal is produced in response to the non-application of an input signal.

Attention should be given to the fact that the device illustrated in FIGURE 2 as well as all the other devices described hereinafter represent so-called "series" translating devices. This means that the load circuit or circuits are arranged in a series relationship to a winding associated with the core in regard to the power pulse source. As a result, the intended output signals are produced, as a rule, through the excursion of the magnetic core from plus residual flux density towards plus saturation flux density, as illustrated in the case of FIGURE 2.

It also should be realized that not only the device of FIGURE 2, but every "series" translating device, as described in this specification, operates as a complementer in reference to what may be called a "reverting" pulse. Such a "reverting" pulse causes the magnetic core to be flipped from plus $B_R$ to minus $B_R$ or, more generally speaking, from the position on the loop, which the core has acquired as a result of the power pulse, to the very opposite position. There is no desired output pulse, whenever a reverting pulse has been applied, because the next following power pulse finds the core in the minus $B_R$ position and drives it through the high impedance region of its hysteresis loop, the result of which is to leave the core at plus $B_R$. The second following power pulse will then cause the core to travel from plus $B_R$ over the low impedance portion of its hysteresis loop towards plus $B_S$, provided that there was no interfering reverting pulse, and an output pulse will result in response to the non-application of the reverting pulse.

If it is desired to use the device as an amplifier, and not as a complementer so as to produce the intended output signal in response to the application of an input signal, then this input signal cannot be employed as a reverting pulse. The reverting pulse must be applied by a source which is not the signal source, and the signal itself must be used to inhibit the passage of the reverting pulse through the signal winding. It is, therefore, only through a double negation, that a "series" translating device can be converted from a complementer into an amplifier.

It should be understood, however, that the term "amplifier," as used here and hereinafter in this specification, is not confined to cases of actual amplification, but extended to cover all devices which furnish the intended output signal in response to the application of an input signal, regardless of the fact that the power, current or voltage ratio may be greater than, equal to or less than unity.

Figure 3A:
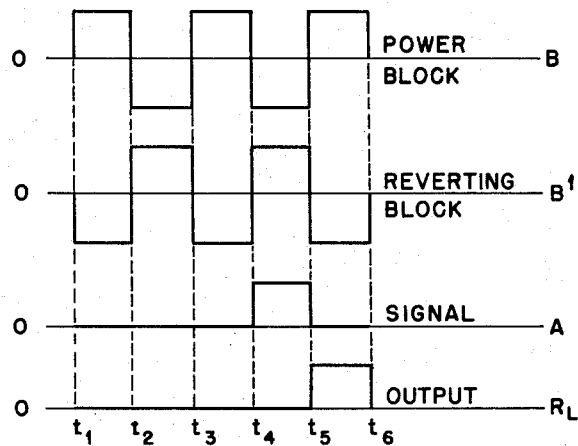

FIGURE 3 shows a signal translating device which, in accordance with the foregoing explanations, illustrates the conversion of the complementer of FIGURE 2 into an amplifier. The winding 2 in FIGURE 3 corresponds exactly to the winding 2 in FIGURE 2. The conversion from a complementer into an amplifier expresses itself in the differences between the windings 1 of the two drawings and the electric impulses applied to them. The electric impulses applied at terminal $B^1$ in FIGURE 2 operate as blocking pulses, as explained hereinabove. Their only purpose is to prevent any current flow through the signal winding during the power pulse periods. In contrast thereto, the electric impulses applied to terminal $B^1$ in FIGURE 3 operate both as blocking pulses and reverting pulses. During the power pulse period, they fulfill the same function as the blocking pulses applied at terminal B in FIGURE 2. During the signal period, they flip the core back to minus $B_R$, as discussed hereinabove. Since these pulses are applied in form of clock pulses, the core is constantly flipped back to minus $B_R$, and, consequently, there will be no desired output pulse as long as gate G permits the passage of these reverting pulses. The only way, therefore, to obtain the desired output pulse is to inhibit the passage of these reverting pulses through the gate G, and this is accomplished through the application of the signal pulse which is employed as an inhibiting impulse to close the gate. As a result, the desired output pulse emanates in response to the application of the signal pulse. The operating time cycle for FIGURE 3 is shown in FIGURE 3a.

Figure 4:
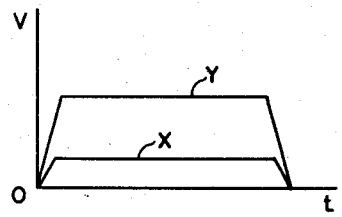

As long as no signal pulse is applied, the material operates in the high impedance portion of the hysteresis loop, and there is very little output. A typical form of this kind of output is shown in waveform X, FIGURE 4. This output occurs during the power pulse periods and is called a sneak output or sneak pulse.

If a signal pulse is applied, the inhibitory gate prevents the reverting pulses which are applied to terminal $B^1$ from reaching coil 1. When this happens, the material remains at plus $B_R$ where it was left at the end of the preceding power pulse period. Now, the succeeding power pulse will operate the material from plus $B_R$ to plus $B_S$. This is the low impedance portion of the loop, and the core will present a low series impedance. An output form such as curve Y, FIGURE 4, will appear across $R_L$. Then, at the end of the power pulse period, the material returns to plus $B_R$. After that, it may be sent to minus $B_R$ by another reverting pulse at $B^1$, or the passage of the reverting pulse may be inhibited, as desired, and another output pulse obtained.

The conversion of the complementer of FIGURE 2 into an amplifier may also be accomplished in the following manner: The polarity of the output is to be inverted so as to obtain negative output pulses at all times, except when there is a signal; the output will then be zero. If then a positive direct current shift is effected by an amount equal to the amplitude of the negative output pulses, the complementer has been transformed through double negation into the equivalent of an amplifier.

The power delivered to the load may be many times larger than the power required of the information pulse. A net power gain is, therefore, obtainable in the signal translating device. Many factors influence the amount of power obtained. One of the most important factors, however, has to do with the extent to which the unwanted pulse, known as the sneak pulse and shown at X in FIGURE 4, may be tolerated in any practical situation. Another important factor is represented by the ratio of the slope on the steep portion of the hysteresis loop between plus $B_R$ and minus $B_R$ to the slope of the flat portion of the hysteresis loop between plus $B_R$ and plus $B_S$. A material with a rectangular hysteresis loop is desirable for this signal translating device, although by no means completely necessary.

In FIGURE 3a, the waveforms applied to terminals B and $B^1$ are mirror images with respect to the time axis. This condition need not be rigidly met, however; their amplitudes may differ, depending on the winding constants, and their durations may differ, depending on the degree of blocking overlap considered necessary or desirable. During the power pulse periods, the voltage applied to $B^1$ should be equal to or greater than the amplitude of the pulse in the signal winding resulting from hysteresis loop traverse during the power pulse, and during the signal periods, the voltage applied to B should be sufficient in amplitude to block the flow of current in the output winding.

Actually, $t_1$, $t_2$ and $t_3$ and so on mark the boundaries of the periods allotted to the power and signal pulses and indicate by no means the length of these pulses. The period between $t_2$ and $t_3$, a signal pulse period, can be greater or less than the period $t_1$ to $t_2$, a power pulse period. Because of the selectibility of the lengths of the respective pulse periods, this signal controlled translating device may also serve as a memory or as a delay device.

In the foregoing descriptions, rectangular waves have been shown for the various power, signal, reverting and blocking voltages. This is not required. The only requirements on the various waveforms are: (1) The blocking voltage must be at least as large as the pulse which it is blocking. (2) The pulses applied to the windings which cause the core to traverse portions of its hysteresis loop must be such that the integral of these voltages with respect to time is selected to be large or small in accordance with the size of the output signal which is desired.

In view of the fact that the power pulse is derived from a source whose waveform may be accurately fixed, output pulses from this amplifier are of standard waveforms as determined by the power pulse source. Therefore, this amplifier serves also as a pulse former.

Figure 5:
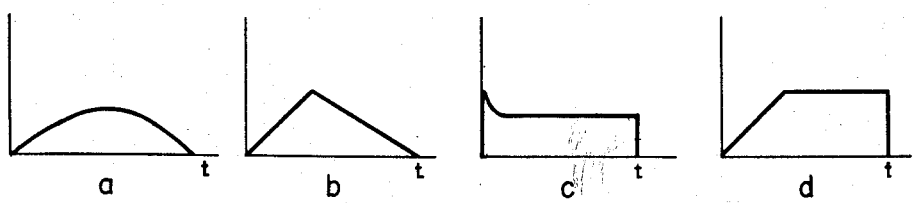

FIGURE 5 shows some typical shapes of power pulses which might be used. FIGURE 5A illustrates a half sine wave; FIGURE 5b pictures a triangular wave; FIGURE 5c exemplifies a pulse with an initial high amplitude peak and a steep fall to an even-leveled portion which may be regarded as a preferred wave form; and FIGURE 5d shows a flat-top pulse with unequal rise time and fall time.

The description has been directed to the core material being reverted from plus $B_R$ to minus $B_R$. Actually, it is not necessary to operate over the full range of $B_R$. The material could operate, for example, from plus $B_R$ down to plus ⅓ $B_R$. Operation over part of the hysteresis loop will bring decreases in power without decreasing the volume of core material involved.

It is also possible to operate the core material over a range greater than minus $B_R$ to plus $B_R$. In such case, the integral of the voltage with respect to time of the power pulse must be greater than the value required to cause the core to travel from minus $B_R$ to plus $B_R$, and will cause the core to travel beyond plus $B_R$ toward plus $B_S$. This operation would otherwise require two power pulse periods, one in which the core is operating from minus $B_R$ to plus $B_R$, and one to travel from plus $B_R$ to plus $B_S$. In this case, an output pulse will always appear, and the duration of the output pulse will depend upon whether the core had been at minus $B_R$ or plus $B_R$.

Several input circuits will now be shown to operate this amplifier with both constant current and constant voltage sources. A constant current source is theoretically a source of infinite impedance. A constant voltage source is theoretically a source of zero impedance. These definitions are idealized and are merely used to obtain a simplification in the analyses of circuits. From a practical point of view, the constant current source is a source whose impedance is comparatively high with respect to the load, and a constant voltage source is a source whose impedance is comparatively low with respect to the load.

Figure 6:
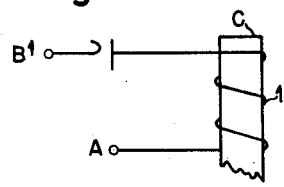
Figure 6A:
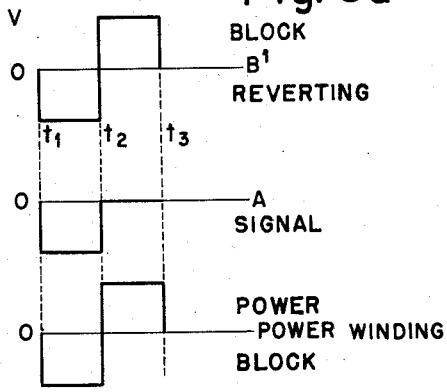

FIGURE 6 shows a method of using a low impedance voltage source for the pulses on the input winding. A voltage as shown in the accompanying waveform diagram of FIGURE 6a is applied to terminal $B^1$ from a low impedance voltage source. In this case, $t_1$ to $t_2$ is the signal period. If an output is desired, a signal pulse, as illustrated, is applied to terminal A. This prevents source $B^1$ from sending the core from plus $B_R$ to minus $B_R$. A power pulse is shown in the bottom waveform of FIGURE 6a. Period $t_2$ to $t_3$ is the power pulse period. It goes without saying that the diodes, the direction of winding of coil 1 and the polarity of the applied voltages may be reversed in a similar way as is discussed, hereinafter, in connection with FIGURES 7, 7a, 8 and 8a.

Figure 7:
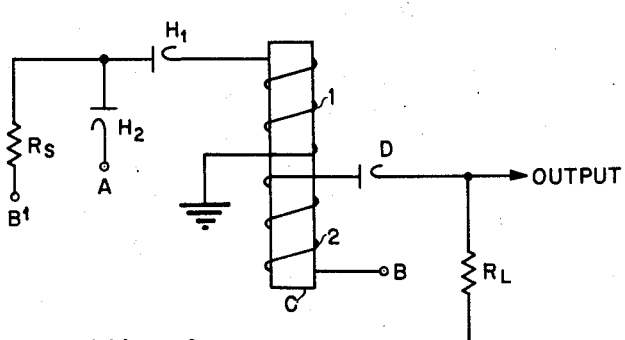
Figure 7A:
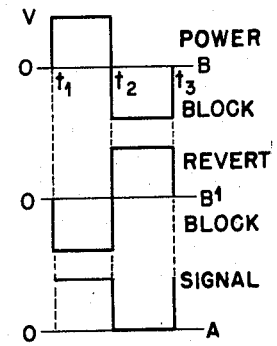

FIGURES 7 and 8 illustrate two input circuits using a high impedance voltage source for the input. C is a core of ferromagnetic material with which coils 1 and 2 of an amplifier are associated. The waveform applied to terminal B is the familiar alternate power and blocking voltage that has been previously described. In the example of FIGURES 7 and 7a, terminal $B^1$ of the signal winding circuit is supplied during the period $t_1$ to $t_2$ with a negative block. During the period $t_2$ to $t_3$, terminal $B^1$ goes positive. $R_S$ is a high resistance sufficient to make source $B^1$ appear like a constant current source in respect to the amplifier. The signal input terminal is maintained at a positive potential. If a signal is desired, a negative pulse is applied to terminal A to decrease the potential at terminal A to O. This selectively prevents the application of the current from source $B^1$ to coil 1, and a large output will result in the succeeding power pulse cycle. This particular arrangement of polarities provides that the amplifier produces a positive output pulse when a negative pulse is applied to its input. The input signal polarity can be changed by reversing the diodes $H_1$ and $H_2$, reversing the direction of winding of coil, reversing the polarities of the pulses applied at $B^1$ and shifting the signal voltage level, or the output pulses can be changed by reversing diode D and the polarities of the pulses applied at B. The arrangement for reversing the input signal polarity is shown in FIGURE 8 together with FIGURE 8a. This arrangement provides a positive output when a positive pulse is applied on the input. The power period is $t_1$ to $t_2$, and $t_2$ to $t_3$ is the signal period, as in FIGURE 7a. However, the direction of winding of coil 1 in FIGURE 8 is opposite to the direction of winding of coil 1 in FIGURE 7, and the polarity of the voltages applied to terminals $B^1$ and A is reversed. If an output is desired, terminal A has a positive pulse applied thereto to raise the potential at terminal A to O during the period $t_2$ to $t_3$, as shown in FIGURE 8a. Now the amplifier has both positive input and positive output.

The various equalities of voltages which have been specified apply only to the cases where there is a unity turns ratio between power and input windings. If the turns on these windings are not equal, as may be the case, the turns ratio will multiply one side of the equality. Also, in this amplifier, the description is based upon a particular set of pulse polarities. It should be noted that either the signal polarities or the power pulse polarities or both could be reversed by reversing the direction of the winding.

One of the matters of concern in connection with the above-described amplifiers is the removal of the sneak output or sneak pulse. FIGURE 9 shows a circuit for suppressing the sneak pulse. Winding 2 is the output coil of a magnetic amplifier. A positive power pulse is applied to terminal B. At the same time, a negative pulse is applied to terminal L, as shown in FIGURE 9a. This negative pulse is of such magnitude that when no output is expected from the amplifier, point E is at zero potential. In other words, the voltage at point L is made equal to the sneak current times R. Then, when an output is desired, point E assumes a positive potential of the waveform applied to terminal B.

FIGURE 10 shows a discrimination method using thyrite in place of the diode K shown in FIGURE 9. The resistor with the X through it is a thyrite resistor. While its resistance is very high for the low voltages of the sneak pulse, it is very low for voltages of the order of the output pulse.

FIGURES 11 and 11a illustrate another form of a sneak pulse suppressor circuit. Coil 2 is the output coil of a magnetic amplifier. Power and block voltages, as shown, are applied at terminal B. The resistor R carries a current equal to the sneak pulse current which flows from ground through diode M and resistor R to the source minus E. When the output from the amplifier is merely the sneak output, the sneak current is applied through diode D in series with R, and the output voltage remains approximately zero. However, when the desired output pulse is present, diode M disconnects, and the output voltage jumps up to the voltage of the power pulse. In this condition, the power pulse supplies to the sneak suppressor circuit, i.e., R in conjunction with —E, an amount of power equal to the output voltage times the sneak pulse current. Since this is approximately equal to the power required to set the core, this sneak pulse suppressor circuit subtracts from the power output an amount equal to the power of the input. It should be noted that, if the amplifier is to feed any gate circuits, the resistor R can carry all of the gate currents which must be supplied by the amplifier.

It is possible to construct an amplifier utilizing only one coil associated with a core of ferromagnetic material. The advantage of this type of amplifier is that it would be easier to construct than an amplifier with two coils. The limitation is that this type of amplifier has current gain, but no voltage gain. In this respect, it is similar to the vacuum tube cathode follower and could be called a magnetic cathode follower.

FIGURE 12 is a schematic showing of a single coil magnetic amplifier. A single amplifier coil is associated with a core of ferromagnetic material C. The waveform shown in the timing diagram of FIGURE 12a is applied to terminal B while terminal $B^1$ is held at zero potential. During the period $t_1$ to $t_2$, terminal B is positive, and current flows from terminal B through the amplifier winding, diode $D_1$ and resistor $R_L$ to ground. Referring to the hysteresis loop of FIGURE 1, the core is moved from minus $B_R$ to plus $B_R$. During the period $t_2$ to $t_3$, terminal B is negative with respect to ground, and current flows from terminal $B^1$ through resistor $R_S$, diode $D_2$ and the amplifier winding to terminal B. Note that, in general, $R_S$ will be different from $R_L$ and generally will be larger. Therefore, the positive and negative halves of the waveform applied to terminal B are not necessarily equal in magnitude.

When operated in this condition, no output results from the amplifier. If an output is selectively desired, the waveform shown in FIGURE 12a is applied to terminal A. This is a negative voltage equal to or greater than the negative voltage applied to terminal B during the period $t_2$ to $t_3$. This blocks diode $D_2$ and prevents the core from being operated from plus $B_R$ to minus $B_R$. The following positive pulse applied to terminal B will then find the core material in a low impedance state, and a large output will result. Since $R_S$ is in general larger than $R_L$, a current gain is obtained from this amplifier. The essential feature of the $D_2$—$R_S$ circuit and the input terminal A is that this circuit is a means for inhibiting the negative reset pulse applied to the coil. Other methods to do this will be described hereinafter.

FIGURE 13 shows a modification of the single coil magnetic amplifier of FIGURE 12. Here the operation of the core is the same as described for FIGURE 12. The core material operates between minus $B_R$ and plus $B_R$, if no power output is desired, or between plus $B_R$ to plus $B_S$, if a power output is desired. $R_S$ is a high impedance, relative to $R_L$, and the waveforms as shown in FIGURE 13a are applied to terminals B and $B^1$. The voltage applied to terminal $B^1$ is sufficient to allow a current equal to the magnetizing current required by core C to flow through the coil. Between $t_2$ and $t_3$, terminal B goes negative by an amount equal to the voltage developed in the coil when the core flips. Point E is then at zero potential during the period when core C flips from plus $B_R$ to minus $B_R$. Therefore, all that is required to inhibit this flipping is an input voltage at terminal A which is equal to or greater than the negative voltage applied to B. This will block diode $D_2$. The current which flows into the signal source at A through diode $D_3$ is equal to the current through $R_S$ which, in turn, is equal to the flipping current. Therefore, it can be seen that, with this type of input circuit, the amount of control power is equal to the power required to set the core from plus $B_R$ to minus $B_R$ and that this is the minimum that could possibly be required. Of course, the signal is applied to A only when an output is desired. It should be noted that the reason for applying the negative voltage to B during the period $t_2$ to $t_3$ is to keep point E from rising above ground potential during that period. This blocks diode $D_1$ and prevents the output circuit from interfering with the input circuit.

In the magnetic amplifiers previously described, it is sometimes desirable to obtain a steady output when pulses are applied to the input. This can be done by utilizing a rectifier or suitable filter or integrating circuits at the output.

Figure 14:
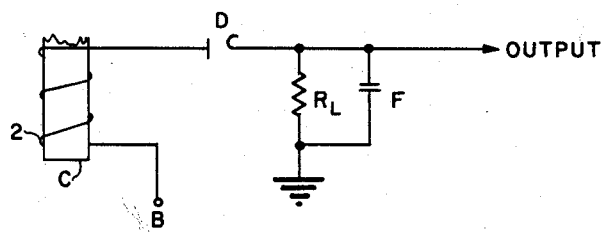
FIGURE 14 is a schematic showing of an additional output circuit.

FIGURE 14 exemplifies a circuit for obtaining a steady output. The output coil of a magnetic amplifier, as illustrated in the arrangement of FIGURE 3, is shown at 2. The output pulses charge up the capacity F which discharges slightly during the output pulse periods, and a steady output is obtained. If it is desired to reduce the steady output to zero, the input pulses to the amplifier are removed. It may take several pulse periods for the charge to leak off capacity F. If a faster decay is desired, a clamp pulse could be applied to the output to reduce the output rapidly to zero.

Figure 15:
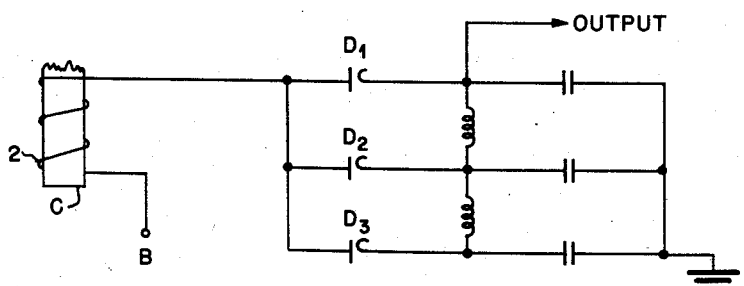
FIGURE 15 is a schematic showing of another output circuit.

Another circuit to obtain a steady output is shown in FIGURE 15 which utilizes an ordinary delay line as a pulse stretcher. The circuit shown with diodes $D_1$, $D_2$ and $D_3$ feeding various points on the delay line is a standard type of a pulse stretcher. It utilizes the propagation time from the various points on the delay line to the output to increase the length of the pulse. In an amplifier which operates on a 50–50 duty cycle, i.e., one in which the signal period and power period are of equal length, only two diodes would be necessary. The delay time between the two diodes would be equal to the length of either the signal or power periods. By the time the main output pulse injected at the output end of the delay line would have died down, the pulse from the diode down the transmission line, which is delayed by a time equal to the power pulse period, will have arrived at the output, and it will last for a period equal to the signal period. Therefore, a steady output will be obtained when pulses are applied to the delay line. This type of circuit has the advantage of a much more rapid fall time than the capacitor circuit shown in FIGURE 14 and, in general, no reset pulse will be required with this type of a circuit.

Of course, where the pulse periods are not the same, for example, where the signal period is longer than the pulse period, the same type of circuit could be used. However, it would be necessary to employ more than two diodes. In the circuit of FIGURE 15, three diodes are shown. This could be used for any signal period length up to the point where the signal period is twice the power period. It is evident how this principle can be extended to include signal periods of any duration.

Figure 16A:
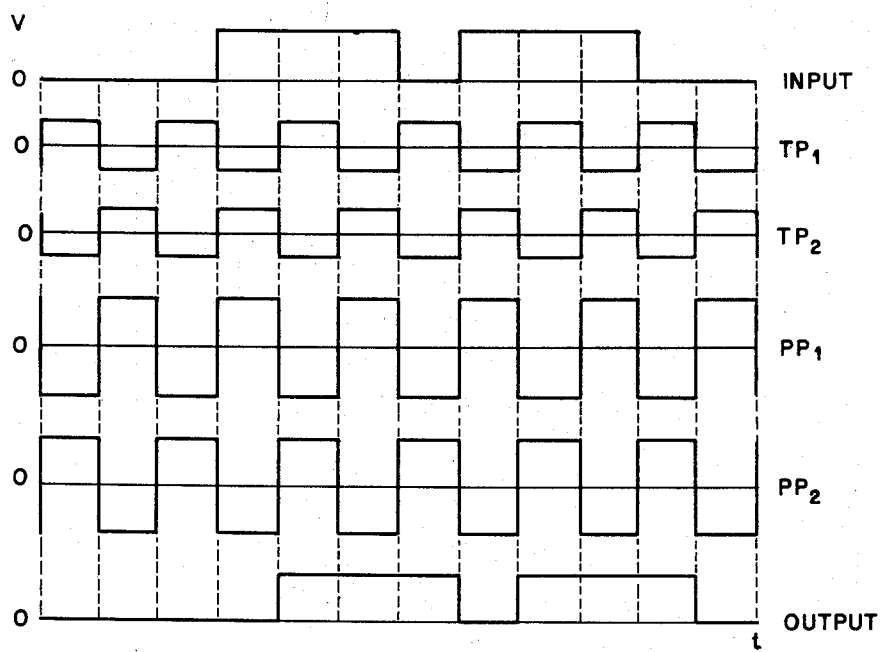
FIGURE 16a represents the operating time cycle for the circuit of FIGURE 16.
Figure 16:
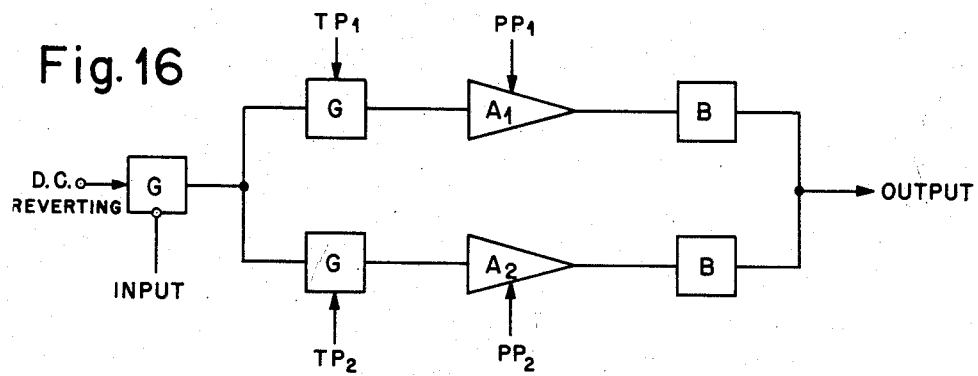
FIGURE 16 is a block diagram of a circuit incorporating the invention.

FIGURE 16 shows a method of interlacing signals in such a manner that the rate of transmission of information over one single line can be doubled. This means that, without any change in the speed of propagation, the time required for the transmission of a given quantity of information is cut into one half. To accomplish this effect, a pulse envelope system may be used, as illustrated in the timing diagram of FIGURE 16a. The timing pulses (TP) and power pulses (PP) are shown in relation to the input and output pulses. The elements $A_1$ and $A_2$ are magnetic amplifiers as previously described. The timing pulses $TP_1$ and $TP_2$ alternately gate the applied direct current into amplifier $A_1$ and $A_2$ during the time intervals preceding the respective power pulse periods to produce the reverting effect described hereinabove. As a result, the power pulses $PP_1$ and $PP_2$ which are alternately applied to either amplifier do not drive the respective cores into the low impedance region and do not effect, therefore, any output. The input signal inhibits the passage of the direct current through the common inhibitory gate, and $A_1$ and $A_2$ alternately produce outputs during such power pulse periods which are not preceded by the application of a reverting pulse. These outputs are then buffed into a common output line.

Figure 16B:
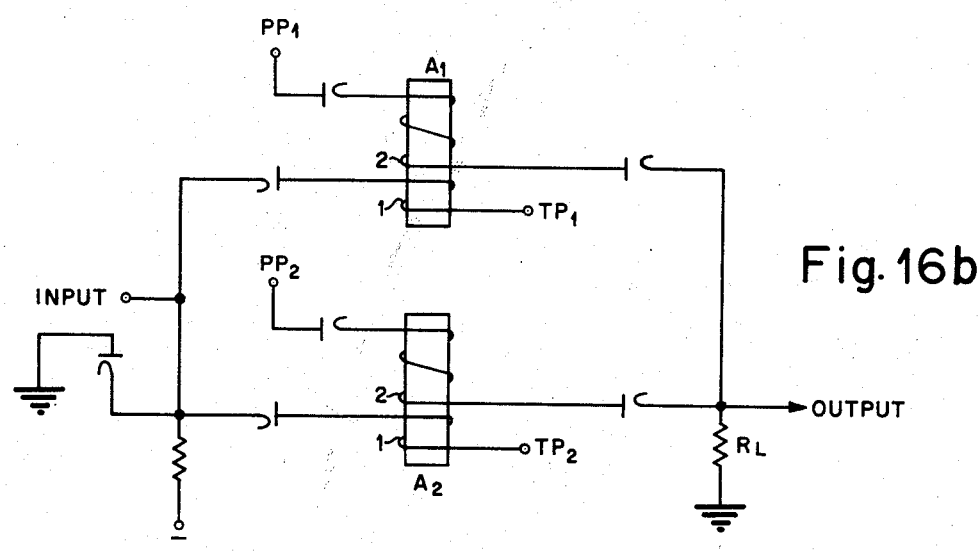
FIGURE 16b is a schematic showing of the circuit of FIGURE 16.

It is to be noted that an interlace of more than two circuits could be used. Three, four or any desired number of gates, amplifiers and buffers could be connected in the same manner as the two circuits shown in FIGURE 16 are connected. A schematic diagram for a two circuit interlace is shown in FIGURE 16b.

This circuit may also be used for the purpose of rearranging the pulses in a group. The pulses are fed into the appropriate amplifiers, as determined by the timing pulses, and are fed out at the time determined by the power pulses. The output pulses could, therefore, have a different array than the input pulses. By the proper use of multiple outputs, an interlace device such as this can be used, furthermore, to take signals arriving on a single input line and distribute them at the proper times, as determined by the timing and power pulses, to several output lines.

Figure 17:
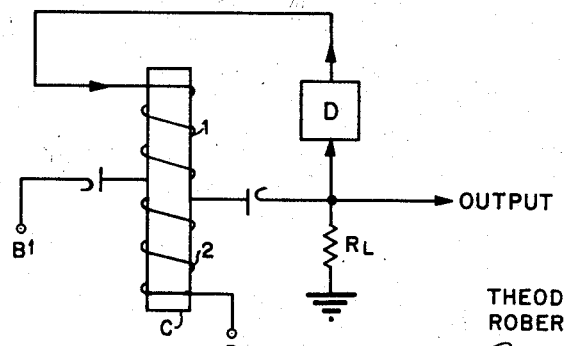
FIGURE 17 is a schematic showing of a frequency divider.

A complementer operating as a frequency divider is shown schematically in FIGURE 17. The timing diagram of FIGURE 17a assists in explaining the operation. No input signal, but only a blocking pulse is applied to terminal $B^1$ of the input winding. Assuming the core to be at plus $B_R$, when a power pulse is fed to terminal B at time $t_1$, an output pulse is produced which, beside being fed to the output terminal, is fed to the input of a delay unit D which may consist of an amplifier, a delay line or some low pass circuit. The resulting delayed pulse is applied as a reverting pulse to winding 1 at time $t_2$ to drive the core to minus $B_R$. When the next power pulse is applied at time $t_3$, there will be no intended output from this complementer as the core travels from minus $B_R$ to plus $B_R$, and no pulse will be applied to winding 1 from the delay unit at time $t_4$. This sequence then repeats itself beginning with the application of the next power pulse at time $t_5$. Therefore, this complementer acts as a frequency divider.

Figure 18B:
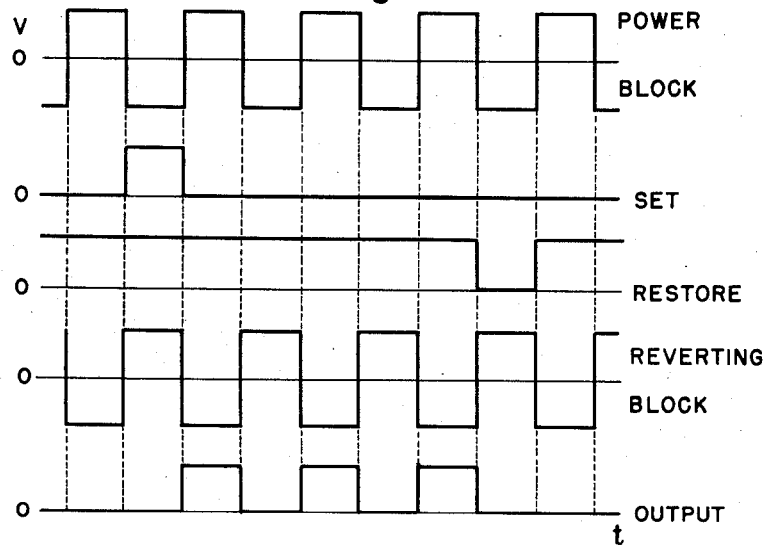
FIGURE 18b represents the operating time cycle for the circuit of FIGURE 18.

FIGURE 18 shows in block form how to use an amplifier for flip-flop effects. The corresponding schematic and timing diagrams are found in FIGURES 18a and 18b, respectively. A set signal prohibits the reverting pulse from driving the core to minus $B_R$ and leads, therefore, to the production of an output signal which, besides being applied to the output line, is fed to a delay unit which will delay the passage of the pulse therethrough for a length of time equal to the power pulse period. The delay unit D may be a delay line, another amplifier or a low pass circuit or a capacitance or inductance. The output of the delay unit D is then buffed onto the input line of the amplifier, after passing through the inhibitory gate G, to permit production of another output pulse during the next power pulse period. In this manner the circuit of FIGURE 18 will continue to produce output pulses. If the feedback loop to the input is broken for the time duration of the input period, the amplifier will no longer produce output pulses, and the flip-flop will be restored. This is accomplished by the inhibitory gate G with a restore signal being applied to inhibit passage of the delayed output pulse. No output results then until a set signal is again applied to the input terminal.

In the schematic of FIGURE 18a, the positive half of the blocking voltage acts as a reverting pulse and keeps the amplifier in the high impedance state by a current flow through winding 1 and resistor $R_1$ to ground. If, however, a setting signal is applied, diode $D_1$ raises the voltage across $R_1$ to block this action and to leave the core C in its low impedance state. This results in an output on the next power pulse. The output is then delayed for the length of the power pulse through the delay line, and, during the next signal period, this delayed output pulse is applied to winding 1 through diode $D_2$, causing the same effect as the set input. Thus, there will be a continuation of output pulses. To restore the flip-flop, a negative signal is applied through diode $D_6$, opening the path of the circulating output pulse and allowing the amplifier to reset itself to the high impedance state again, and, thus, no more output pulses are produced.

To obtain a continuous output rather than a pulsed output, the output from the delay device D may also be buffed into the output line. In this manner, the delayed output pulse is not only fed back to keep the flip-flop set, but is also applied to give an output pulse during the time of the block pulse, thus maintaining a steady output as long as the flip-flop is set. A restore signal will then inhibit any further output signal, and the flip-flop will be rapidly restored.

Figure 19:
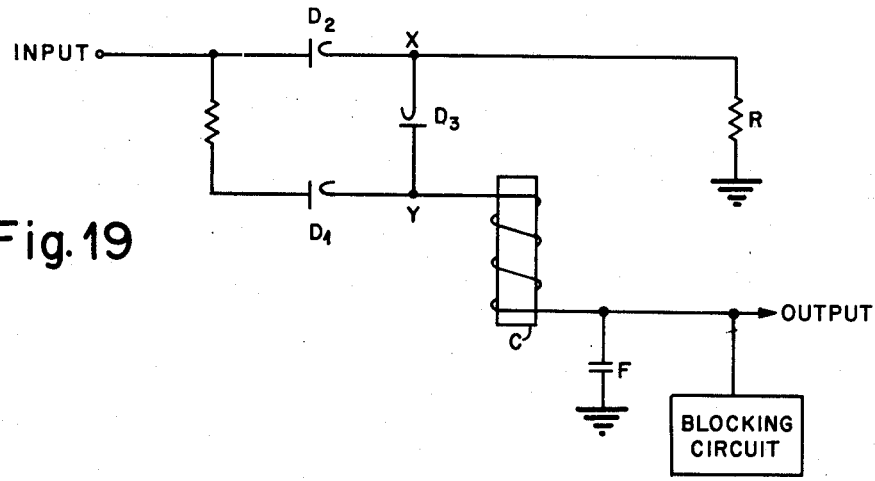
FIGURE 19 shows in schematic form a scale-of-two counter.
Figure 19A:
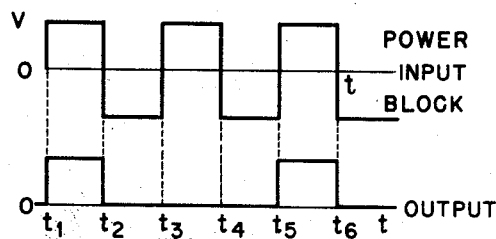
FIGURE 19a represents the operating time cycle for the circuit of FIGURE 19.

A single winding scale-of-two counter is shown in FIGURE 19 with the corresponding timing diagram in FIGURE 19a. At time $t_1$, the input goes positive (power pulse), and diode $D_3$ is cut off due to the fact that there is a higher potential at point X than at point Y. Assuming the core to be at plus $B_R$ flux density at time $t_1$, an output results and capacitor F is charged. At time $t_2$, the input goes negative and disconnects diodes $D_1$ and $D_2$ (blocking pulse). At the same time, a blocking circuit prohibits any flow of current to the load. As a result, capacitor F discharges through the amplifier coil, diode $D_3$ and resistor R to ground. This reverse current flow through the amplifier coil causes the amplifier core to travel to minus $B_R$. Thus, when the input goes positive again at time $t_3$, the core is caused to flip to plus $B_R$, but, since only a sneak output results, capacitor F receives only a small charge. At time $t_4$, when the input signal again goes negative, there is no change in conditions. The cycle of operation repeats again, beginning at time $t_5$. It thus requires two input pulses for each output pulse.

In place of the capacitor in FIGURE 19, the use of an artificial transmission or delay line or pulse forming network may well be used. The use of such devices permits a control of the shape of the output pulses and of the core flipping pulses as well as a more efficient discharge of the energy stored through the winding.

Figure 19B:
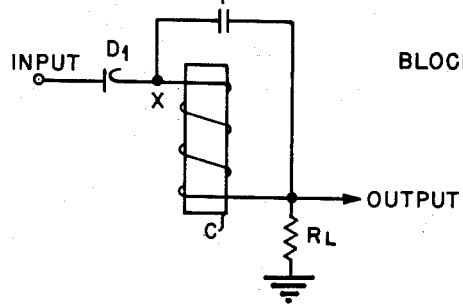
FIGURE 19b shows in schematic form another scale-of-two counter.
Figure 19C:
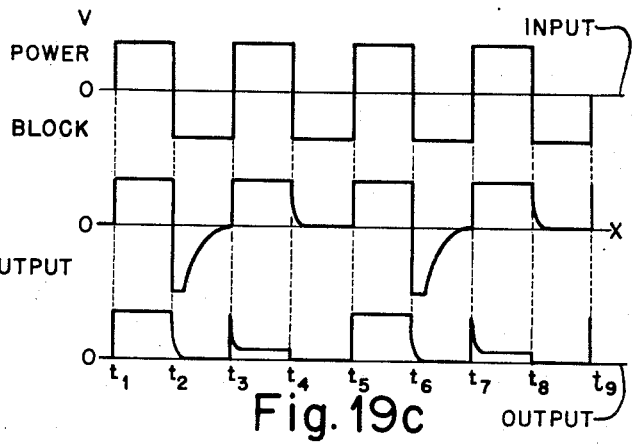
FIGURE 19c represents the operating time cycle for the circuit of FIGURE 19b.

Another form of an amplifier operating as a counter is shown in FIGURE 19b with the corresponding timing diagram of FIGURE 19c. The input wave consists, in accordance with the illustration, of a positive power pulse, which may be either a clock pulse or a selectively applied information signal, and a negative blocking pulse which cuts off diode $D_1$. Assuming the core to be at plus $B_R$ at time $t_1$ when the power pulse is applied, the core travels to plus $B_S$ and then returns to plus $B_R$. This results in the desired output signal, as shown in FIGURE 19c. At time $t_2$, the diode $D_1$ is disconnected, and the energy of the magnetic field causes the coil to charge the condenser F. This condenser then discharges back through the coil, setting the core to minus $B_R$ before the time $t_3$ (reverting pulse). The next following power pulse, which sets the core to plus $B_R$, is not sufficient to produce a regular output signal, but results only in a sneak pulse as shown. At time $t_5$, the power pulse drives the core again to plus $B_S$, and the cycle of operation repeats itself. Thus, there is always one output signal in response to two input signals, as in the case of the device illustrated in FIGURE 19. The waveform marked X in FIGURE 19c indicates the voltage at point X.

Figure 20:
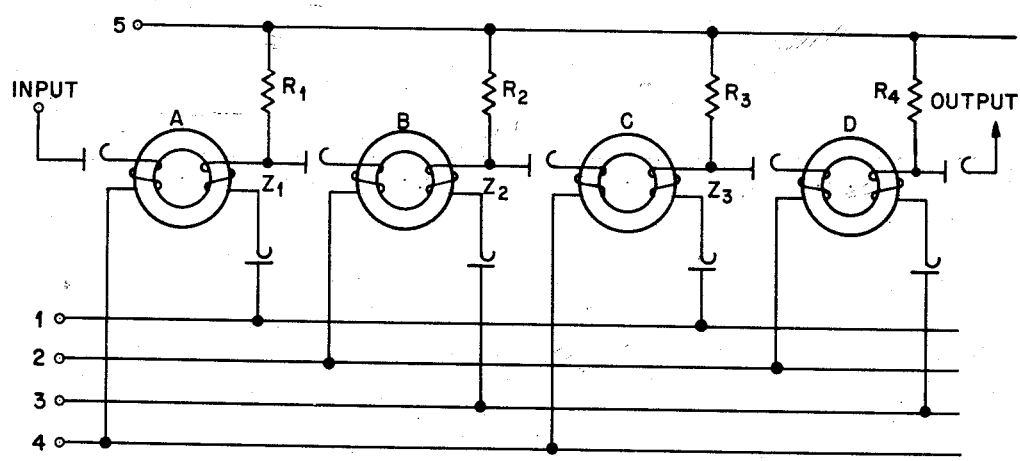
FIGURE 20 is a schematic showing of a shifting register delay line.

Magnetic translating devices may be combined in the manner shown in FIGURE 20 to obtain a shifting register delay line. A plurality of magnetic complementers are connected in chain fashion, and the information is selectively applied to the input winding of the first complementer of the chain. The output winding of each complementer is connected through a diode to the input winding of the next succeeding complementer, and the output of the last complementer in the chain may be used as the final output. It is to be understood, however, that outputs may be taken from any complementer in the chain. The chain may be as long as desired. The output from the register may also be joined to the input through appropriate gates, as is well known in the art, to form a circulating register.

Figure 20A:
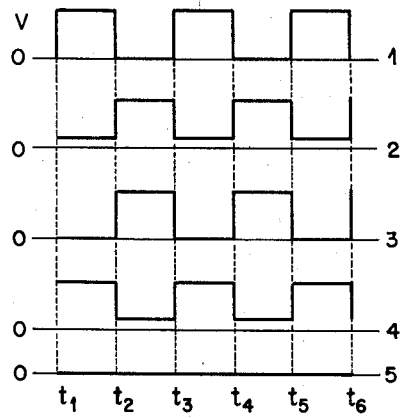
FIGURE 20a represents one operating time cycle of the circuit of FIGURE 20.

Two examples are given for the operation of such a shifting register. In the example of FIGURE 20a combined with FIGURE 20, lines 1 and 3 alternately provide the power pulses for alternating complementers, lines 2 and 4 alternately provide both the larger blocking pulses and the smaller sneak suppressor pulses in such a way that a blocking pulse in line 2 is accompanied by a sneak suppressor pulse in line 4 and vice versa, and line 5 is kept at a zero potential.

If no input signals are applied at the input to respective complementers, the complementers are maintained at plus $B_R$ during the input period. During the output period, when a power pulse is applied to any complementer, the core thereof travels from plus $B_R$ to plus $B_S$ and then returns to plus $B_R$ when the power pulse is removed. As a result, a large current is produced in the output winding. The diodes in the intercore connections and the blocking pulses will prevent any backward flow of information as well as the forward flow of information to more than one core.

If an input signal is applied to any complementer, the core thereof will travel from plus $B_R$ to minus $B_R$ and, during the output period, from minus $B_R$ to plus $B_R$. As a result, only a small current, referred to as a sneak pulse, will be produced in the output winding. The simultaneously applied sneak suppressor pulse will prevent the sneak pulse from passing through the intercore connection diode, and the sneak pulse will be carried by the corresponding resistor R.

If an input signal had not appeared prior to the application of the power pulse to the complementer, its core, being at plus $B_R$ would have presented a low impedance, and the resulting output current would have been much larger than the small sneak pulse suppressor voltage and would, therefore, have passed through to the input winding of the next following complementer.

Referring now to an information entry as "one" and to a no-information entry as "zero," it is to be noted that, if a "one" had been stored in complementer A, it becomes a "zero" when it is shifted to complementer B, a "one" when it is shifted to complementer C, a "zero" when it is shifted to complementer D, and so on down the chain of complementers. It is apparent, therefore, that alternate complementers store the information entry and its complement, respectively. After the operation of the first two complementers, the cycle will repeat itself, and the third complementer will behave in the same way as the first complementer, the fourth complementer will behave in the same way as the second complementer, and so on.

Figure 20B:
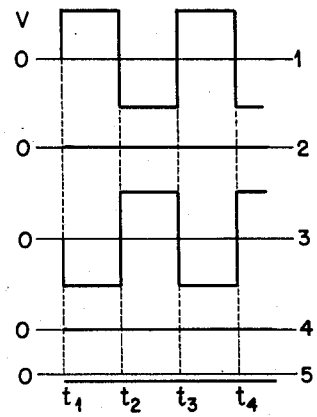
FIGURE 20b represents another operating time cycle of the circuit of FIGURE 20.

In the example of FIGURE 20b combined with FIGURE 20, lines 1 and 3 alternately provide the power pulses and the blocking pulses in such a way that a power pulse in line 1 is accompanied by a blocking pulse in line 3 and vice versa. Lines 2 and 4 are kept at zero potential, and line 5 is supplied with a small negative potential. The value of resistors R and the voltage applied to line 5 is such that, when a sneak output occurs from any complementer, the corresponding point Z will be at zero potential, and, since lines 2 and 4 are also at zero potential, no current will flow through the intercore connection diode. If a complementer is, however, at plus $B_R$ when a power pulse is applied thereto, point Z will have a large positive voltage, and current will flow through the intercore diode to flip the succeeding complementer core. An output may be taken from any of the intermediate complementers of the shifting register of FIGURE 20.

A shifting register may not only be used for delaying effects, but also for stepwise increasing the power gain. This can be accomplished through the installation of cascaded complementers of increasing power levels. The shown configuration may be used for this specific purpose.

Figure 21:
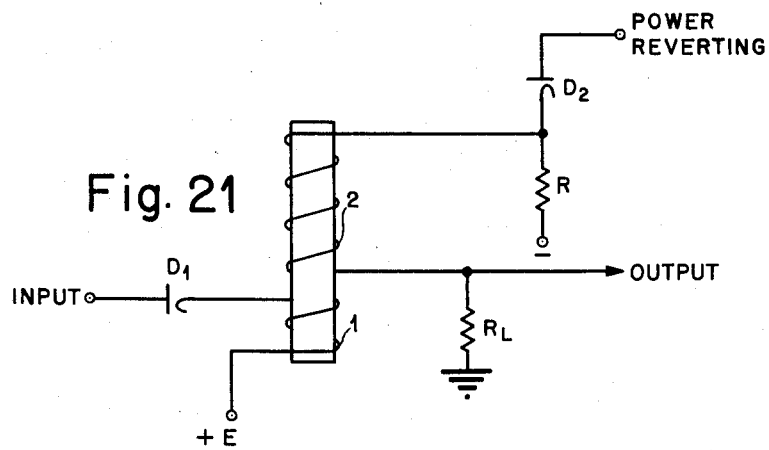
FIGURE 21 is a schematic showing of an additional embodiment of the invention.
Figure 21A:
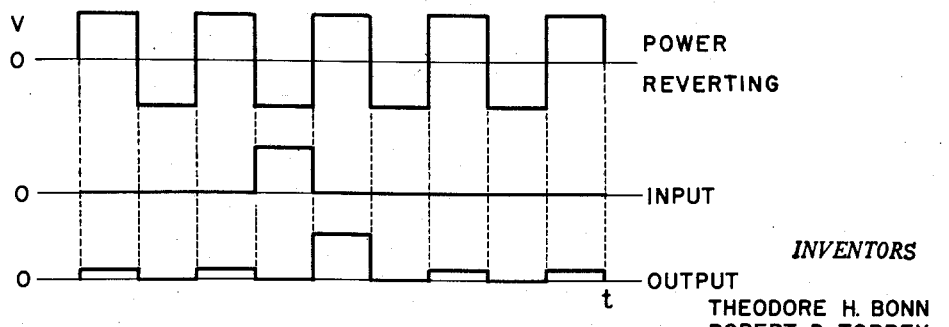
FIGURE 21a represents the operating time cycle for the circuit of FIGURE 21.

The translating device of FIGURE 21 is an amplifier, not a complementer. FIGURE 21a illustrates the operating time cycle for this apparatus. In this amplifier, if no signal is applied to the input, the core travels from minus $B_R$ to plus $B_R$ during the positive half of the power pulse. During the negative half of the power pulse, diode $D_2$ is cut off, and there is a current flow from ground through $R_L$, amplifier coil 2 (the output winding) and resistor R to negative potential. Because of this reverse current flow through the output winding, the core travels from plus $B_R$, counterclockwise around the BH loop to minus $B_R$. Since the core remains in the high impedance state, there is no intended output. To protect the input circuit against any interference from the currents flowing in the output winding, the signal winding is returned to a positive voltage which is equal and opposite in value to the voltage induced (generated) in it by current flowing in the power winding 2 when the reverting pulse is applied. As a result, diode D is cut off.

If a signal is applied to the input winding, it is applied during the negative half of the power pulse, as shown in FIGURE 21a. The resultant flow in the signal winding will cancel the effect of the reverse current flow in the output winding which otherwise would drive the core from plus $B_R$ to minus $B_R$, as described hereinabove. As a result, the operating point remains at plus $B_R$. The next positive power pulse will then carry the core to plus $B_S$ and produce the intended output across $R_L$.

The amount of current needed in the signal winding to cancel the effect of the reverse current in the output winding is determined by the operating effect of resistor R which may be chosen to limit the reverse current through the output winding just to the amount necessary to set the core to minus $B_R$. In this situation, the signal source need merely supply this amount of current to keep the core at plus $B_R$, provided that there is a unity turns ratio between the two windings.

Figure 22:
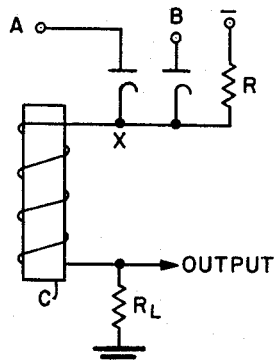
FIGURE 22 is a schematic showing of a modification of the embodiment of FIGURE 21.
Figure 22A:
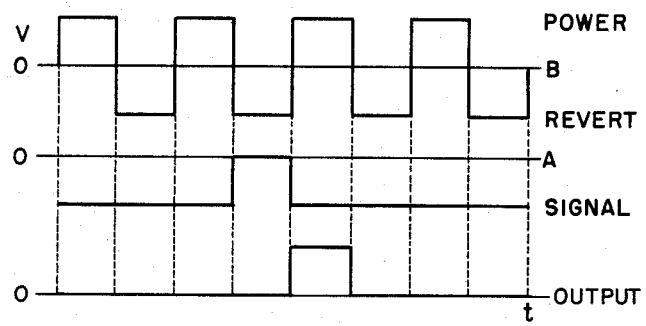
FIGURE 22a represents the operating time cycle for the circuit of FIGURE 22.

A single winding version of this amplifier is shown in FIGURE 22. The operation of this amplifier is identical with that of the two-winding amplifier of FIGURE 21 except that here the input signal merely keeps point X from going below ground potential. As a result, the core remains at plus $B_R$, and the next power pulse will give an output. FIGURE 22a illustrates the waveforms for this amplifier.

Figure 23:
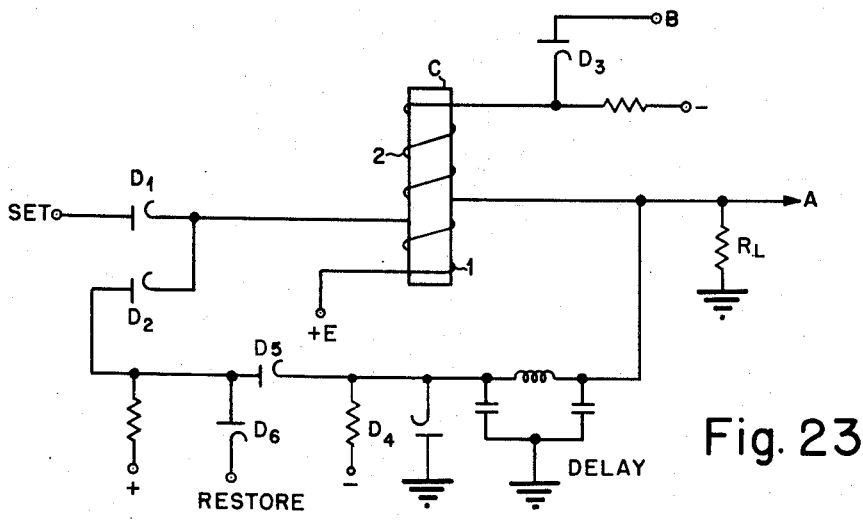
FIGURE 23 is a schematic showing of a circuit utilizing the embodiment of FIGURE 21 for flip-flop effects.
Figure 23A:
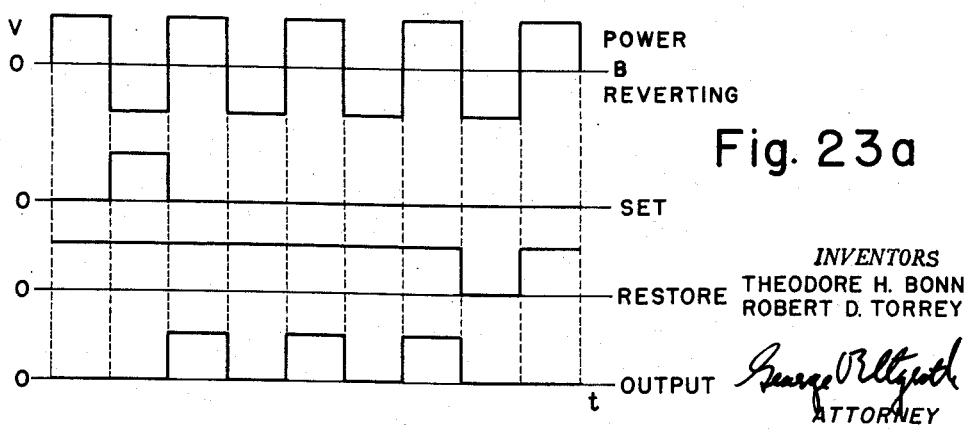
FIGURE 23a represents the operating time cycle for the circuit of FIGURE 23.

FIGURE 23 shows the use of the amplifier of FIGURE 21 within the flip-flop circuit of FIGURE 18a. Due to the different operation of this amplifier, the blocking pulses of FIGURE 18a can be eliminated, as indicated in the timing diagram of FIGURE 23a.

In the case of magnetic translating devices connected in cascade, such as in a shifting register, the number of translating devices needed can be reduced, if the signal transmission from a preceding device to a subsequent device is delayed until the completion of a power pulse. Then, all devices may be operated by the same power pulses. The necessary delay may be obtained from a delay line or any other element, such as in inductor or capacitor,, that is capable of storing energy.

FIGURE 24 shows a block digram of such a circuit. A schematic digram for this circuit is given in FIGURE 24a. FIGURES 24 and 24a show a common power pulse input and a common blocking pulse input for two translating devices. The blocking pulse performs two different functions. One function is, as usual, to block the interference of the power circuits with the signal input circuits. The other function is to prevent diode $D_4$ from transmitting the output of capacitor F to the input winding of the core $C_1$ amplifier during the power period.

Two complementing magnetic translating devices are shown in FIGURE 24a, and the operating time cycle for this circuit is illustrated in FIGURE 24b. During the power pulse period, the capacitor F will be charged to the potential of the power pulse, provided that there was no preceding signal input. The capacitor cannot discharge, however, utnil the blocking pulse applied at terminal $A^1$ with its blocking effect on diode $D_4$ is removed. The discharge of the capacitor F will set core $C_1$ to its high impedance state (reverting pulse), and the subsequent power pulse will not produce an output from core $C_1$.

A signal input to core C will set this core to its high impedance state (reverting pulse) so that the subsequent power pulse will only result in a sneak output and, therefore, a small charge on capacitor F. As a result, after the removal of the blocking pulse, the input into the signal winding of core $C_1$ from capacitor F will be too small to set this core to its high impedance state, and the subsequent power pulse will create an output from core $C_1$.

The schematic showing in FIGURE 24c shows a circuit for connecting two amplifying magnetic translating devices in cascade and operated by the same power pulses. This circuit is similar to the logical showing in FIGURE 24 except that a positive direct current has been substituted for the blocking pulses. It is to be understood, of course, that this arrangement is used to show another possible mode of operation which may be utilized in connection with FIGURE 24a as well, and that blocking pulses may be utilized in FIGURE 24c in the identical manner that they are used in connection with FIGURE 24a. The operating time cycle corresponding to FIGURE 24c is shown in FIGURE 24d.

In the circuit of FIGURE 24c, a reverting circuit is put into operation as a result of the application of the negative pulses at terminal B. These pulses have accordingly been designated as reverting pulses in the timing diagram of FIGURE 24d. The reverting pulses permit a current flow from negative potential $-V$, through resistor $R_1$, the power winding 2 of the core C amplifier and diode $D_6$ to ground. This current flow resets core C to the high impedance state and prohibits an output from the core C amplifier during the subsequent power period. A similar reverting circiut for the core $C_1$ amplifier includes negative potential $-V$, resistor $R_3$, the power winding 2 of the core $C_1$ amplifier and load resistor $R_L$ connected to ground.

A signal input to winding 1 of core C will prevent the reverting circuit from placing core C in its high impedance state by reason of an opposing magnetomotive force. Accordingly, an output from the core C amplifier will be produced when the next power pulse is applied. This output will charge capacitor F to the potential of this output pulse. At the termination of the power pulse, capacitor F will discharge through diode $D_4$ and input winding 1 of the core $C_1$ amplifier connected to positive potential, it being understood that the positive potential connected to the windings 1 is considerably lower than the positive potential to which the capacitor F is charged. This current flow through winding 1 of the core $C_1$ amplifier produces a magnetomotive force in the core opposing that produced by the reverting circuit, and core $C_1$ is prevented from being placed into its high impedance state. An output pulse from the core $C_1$ amplifier will be produced during the subsequent power period. There may be a partial reset of the core $C_1$ to its high impedance state due to the lower counter-magnetomotive force produced through the discharge of capacitor F to the positive potential. In this situation, the output pulse from this circuit will be of shorter duration with its leading edge delayed for the period required to overcome this partial reset.

While specific embodiments have been described in detail to illustrate the principles of the invention, many modifications and variations for applying such principles in other arrangements, but which do not depart materially from the spirit of the invention, will be apparent to those skilled in the art.

What is claimed, is:

1. In combination, a core of ferromagnetic material capable assuming bistable states of magnetic remanence, a power winding and a signal winding associated with said core, a source of clock pulses and a load circuit connected to said power winding, said load circuit being in a series relationship to one of said windings associated with said core in regard to said source of clock pulses, and a source of reverting pulses connected to said signal winding.

2. The combination according to claim 1 in which said clock pulses consist alternately of power pulses and blocking pulses.

3. The combination according to claim 1 comprising a source of blocking pulses connected to said signal winding.

4. The combination according to claim 1 in which said reverting pulses are selectively applied.

5. The combination according to claim 4 comprising a source of signal pulses connected to said signal winding, said signal pulses rendering ineffective said reverting pulses.

6. The combination according to claim 5 in which said source of reverting pulses and said source of signal pulses are connected to the same end of said signal winding.

7. The combination according to claim 5 in which said source of reverting pulses is a low impedance voltage source.

8. The combination according to claim 5 in which said source of reverting pulses is a high impedance voltage source.

9. The combination according to claim 8 comprising a first and a second unilateral conductor, said first unilateral conductor being connected between said high impedance voltage source and said signal winding, and said second unilateral conductor being connected between said source of signal pulses and the junction of said high impedance voltage source and said first unilateral conductor.

10. The combination according to claim 5 comprising a high impedance element connected between said source of reverting pulses and said signal winding.

11. The combination according to claim 1 comprising a unilateral conductor connected in series with said signal winding.

12. The combination according to claim 1 comprising a device for reversing the polarity of the output pulses and a source of direct current connected to said power winding, said direct current source being of opposite polarity relative to the reversed polarity of said output pulses.

13. In combination, a core of ferromagnetic material having substantial remanent flux relative to saturation flux, a power winding and a signal winding associated with said core, a source of power pulses, a source of blocking pulses and a load circuit connected to said power winding, said load circuit being in a series relationship to one of said windings associated with said core in regard to said source of power pulses, and a source of reverting pulses, a second source of blocking pulses and a source of signal pulses connected to said signal winding, the signal pulses rendering ineffective said reverting pulses.

14. The combination according to claim 13 in which the blocking pulses from said second source are applied simultaneously with the power pulses, the blocking pulses from said first source are applied simultaneously with the reverting pulses, and the signal pulses are selectively applied during the reverting pulse periods.

15. The combination according to claim 13 in which said source of reverting pulses is a low impedance voltage source.

16. The combination according to claim 13 in which said source of reverting pulses is a high impedance voltage source.

17. The combination according to claim 16 comprising a first and a second unilateral conductor, said first unilateral conductor being connected between said high impedance voltage source and said signal winding, and said second unilateral conductor being connected between said source of signal pulses and the junction of said high impedance voltage source and said first unilateral conductor.

18. The combination according to claim 17 in which like electrodes of said unilateral conductors are connected together.

19. The combination according to claim 18 in which the polarity of said reverting pulses corresponds to the sense of maximum conductivity of said first unilateral conductor.

20. The combination according to claim 19 in which the direction of winding is the same for both said power winding and said signal winding, and in which said power pulses are of the same polarity as said reverting pulses.

21. The combination according to claim 19 in which the direction of winding of said power winding and said signal winding is opposite relative to each other, and in which said power pulses are of opposite polarity relative to said reverting pulses.

22. The combination according to claim 13 comprising a high impedance element connected between said source of reverting pulses and said signal winding.

23. The combination according to claim 13 comprising at least one unilateral conductor connected between said signal winding and one of the sources connected thereto.

24. The combination according to claim 13 comprising at least one unilateral conductor connected between said power winding and one of the sources connected thereto.

25. The combination according to claim 13 comprising a unilateral conductor connected between said load circuit and said power winding.

26. The combination according to claim 13 comprising a unilateral conductor and a non-linear resistor connected in series between said power winding and said load circuit, and a source of sneak pulse suppressing voltage connected to the junction of said unilateral conductor and said non-linear resistor.

27. The combination according to claim 13 comprising two unilateral conductors connected in series with like electrodes connected together between said power winding and a reference potential conductor, and a source of sneak pulse suppressing voltage and said load circuit connected in series to the junction of said unilateral conductors.

28. The combination according to claim 13 comprising a capacitor connected in parallel with said load circuit.

29. The combination according to claim 13 comprising a plurality of unilateral conductors and a delay line, in which said plurality of unilateral conductors is connected in parallel between said power winding and different points on said delay line, respectively, said delay line consisting of a plurality of inductors in series connection and a plurality of capacitors connected between inductor terminals and a common conductor.

30. In combination, a core of saturable ferromagnetic material capable of assuming bistable states of magnetic remanence, a power winding and a signal winding associated with said core, means for applying power pulses and blocking pulses alternately to said power winding, a load circuit and a delay unit being connected to said power winding, the output from said delay unit being fed as reverting pulses to said signal winding, and means for applying blocking pulses to said signal winding.

31. The combination according to claim 30 in which at least one of said windings is connected in series with a unilateral conductor.

32. In a magnetic device, the combination comprising, a magnetic core member, a series connected gating circuit including a load winding disposed in inductive relationship with the magnetic core member, a current-carrying impedance member, a rectifier, and terminals to which is applied an alternating voltage, the series connected gating circuit and the magnitude of the alternating voltage, when applied, being such that on one half-cycle of the alternating voltage substantially all of the voltage would be absorbed in driving the magnetic core member from negative to positive saturation and on the other half-cycle of the alternating voltage the rectifier blocks the flow of current through the load winding, and a series connected reset circuit consisting only of a reset winding disposed in inductive relationship with the magnetic core member, a non-linear device, and terminals to which is intermittently applied a direct-current control signal, the series connected gating circuit and the magnitude of the direct-current control signal, when applied, being such as to always effect a driving of the magnetic core member to negative saturation during said other half-cycle of the alternating voltage.

33. A magnetic complementing circuit comprising a core of saturable magnetic material having a first and second opposite magnetic states, said magnetic material having substantial remanent flux relative to saturation flux, first and second windings associated with said core, a load circuit in series with the first of said windings, means for applying a periodically recurring signal to said first winding to normally switch or maintain said core in a first magnetic state and to produce an output signal across said load circuit, means for selectively applying a signal to the second of said windings to cause said core to switch to a second magnetic state and to inhibit the production of an output signal across said load circuit during the next cycle of said periodically recurring signal.

34. A magnetic complementing circuit comprising a core of saturable magnetic material having first and second opposite magnetic states, said magnetic material having substantial remanent flux relative to saturation flux, first and second windings associated with said core, a load circuit in series with the first of said windings, means for applying a periodically recurring signal to said first winding to normally switch or maintain said core in a first magnetic state and to produce an output signal across said load circuit, means for intermittently applying a signal to the second of said windings, said last named signal operating to switch said core to a second magnetic state and to inhibit the production of an output signal across said load circuit during a periodically recurring signal period occurring after a signal has been intermittently applied to said second of said windings.

35. In a magnetic device, the combination comprising a magnetic core member, said core member having substantial remanent flux relative to saturation flux, a series connected gating circuit including a load winding disposed in inductive relationship with said magnetic core member, a rectifier, means for applying an alternating voltage to said series connected gating circuit, said alternating voltage being such that on one half-cycle of said alternating voltage substantially all of the voltage would be absorbed in driving said magnetic core member from negative to positive saturation and on the other half-cycle of said alternating voltage said rectifier blocks the flow of current through said load winding, a reset winding disposed in inductive relationship with said magnetic core member, and means for selectively applying a signal to effect a driving of said magnetic core member to negative saturation during said other half-cycle of said alternating voltage.

36. In a complementing magnetic device, the combination comprising a magnetic core member having first and second saturation states, said magnetic material having substantial remanent flux relative to saturation flux, a series connected gating circuit including a load winding disposed in inductive relationship with said magnetic core member, a load circuit associated with said load winding, a rectifier, means for applying an alternating voltage to said series connected gating circuit, said alternating voltage being such that on one half-cycle of said alternating voltage substantially all of the voltage would be absorbed in driving said magnetic core member from said first to said second saturation states and on the other half-cycle of said alternating voltage said rectifier blocks the flow of current through said load winding, an input winding disposed in inductive relationship with the magnetic core member, and means for selectively applying a signal to said input winding to effect a driving of the magnetic core member from said second state to said first state of saturation during said other half-cycle of the alternating voltage, a subsequent half-cycle of said alternating voltage applied to said gating circuit causing an output signal to be developed across said load circuit when no signal is selectively applied to said input winding with no output signal being developed when a signal is selectively applied to said input winding.

References Cited in the file of this patent

UNITED STATES PATENTS

| | | |
|---|---|---|
| 2,021,099 | Fitz Gerald | Nov. 12, 1935 |
| 2,654,080 | Browne | Sept. 29, 1953 |
| 2,661,453 | Hemingway et al. | Dec. 1, 1953 |
| 2,671,132 | Shenk et al. | Mar. 2, 1954 |
| 2,682,574 | Canfora et al. | June 29, 1954 |
| 2,730,695 | Ziffer | Jan. 10, 1956 |
| 2,731,203 | Miles | Jan. 17, 1956 |
| 2,747,109 | Montner | May 22, 1956 |
| 2,758,208 | Grayson | Aug. 7, 1956 |
| 2,782,325 | Nilssen | Feb. 19, 1957 |
| 2,933,618 | Buck | Apr. 19, 1960 |